US00RE37292E

(19) United States
(12) Reissued Patent
Togino et al.

(10) Patent Number: US RE37,292 E
(45) Date of Reissued Patent: Jul. 24, 2001

(54) OPTICAL SYSTEM AND OPTICAL APPARATUS

(75) Inventors: Takayoshi Togino, Koganei; Koichi Takahashi, Hachioji, both of (JP)

(73) Assignee: Olympus Optical Co., Ltd., Tokyo (JP)

(21) Appl. No.: 09/315,990

(22) Filed: May 21, 1999

Related U.S. Patent Documents

Reissue of:
(64) Patent No.: 5,748,378
Issued: May 5, 1998
Appl. No.: 08/678,970
Filed: Jul. 12, 1996

(30) Foreign Application Priority Data

Jul. 14, 1995 (JP) ..... 7-178657

(51) Int. Cl.[7] ..... G02B 27/14
(52) U.S. Cl. ..... 359/633; 359/630
(58) Field of Search ..... 359/630, 631, 359/633, 636, 637, 638, 640

(56) References Cited

U.S. PATENT DOCUMENTS

| | | | |
|---|---|---|---|
| Re. 27,356 | 5/1972 | Russa | 359/494 |
| 4,026,641 | 5/1977 | Bosserman et al. | 359/869 |
| 4,081,209 | 3/1978 | Heller et al. | 359/631 |
| 4,322,135 | 3/1982 | Freeman | 359/643 |
| 4,669,810 | 6/1987 | Wood | 340/908 |
| 4,969,724 | 11/1990 | Ellis | 359/364 |
| 5,000,544 | 3/1991 | Staveley | 359/630 |
| 5,050,962 | 9/1991 | Monnier et al. | 359/13 |
| 5,093,567 | 3/1992 | Staveley | 250/221 |
| 5,134,521 | 7/1992 | Lacroix et al. | 359/631 |
| 5,459,612 | 10/1995 | Ingleton | 359/630 |
| 5,483,307 | 1/1996 | Anderson | 353/98 |
| 5,506,728 | 4/1996 | Edwards et al. | 359/629 |

FOREIGN PATENT DOCUMENTS

| | | |
|---|---|---|
| 62-214782 | 9/1987 | (JP) . |
| 3-101709 | 4/1991 | (JP) . |
| 8-248481 | 9/1996 | (JP) . |

*Primary Examiner*—Ricky Mack
(74) *Attorney, Agent, or Firm*—Pillsbury Madison & Sutro LLP

(57) ABSTRACT

An image display apparatus which enables observation of a clear image at a wide field angle with substantially no reduction in the brightness of the observation image, and which is extremely small in size and light in weight. The image display apparatus has an image display device (7) and an ocular optical system (8) for projecting the image of the image display device (7) and leading the projected image to an observer's eyeball (1). The ocular optical system (8) has at least three optical surfaces, and a space formed by these surfaces is filled with a medium having a refractive index larger than 1. The three optical surfaces are defined as a first surface (3), a second surface (4), and a third surface (5), respectively, in the order in which light rays pass in backward ray tracing from the observer's eyeball (1) to the image display device (7). The optical surfaces are disposed such that light rays from the observer's eyeball (1) pass through the first surface (3) and are reflected by the second surface (4) and further reflected by the third surface (5), which is a reflecting surface having positive power, and the light rays reflected by the third surface (5) are reflected by the first surface (3) and pass through the second surface (4) to reach the image display device (7).

60 Claims, 10 Drawing Sheets

OPTICAL SYSTEM AND OPTICAL APPARATUS

Matter enclosed in heavy brackets [ ] appears in the original patent but forms no part of this reissue specification; matter printed in italics indicates the additions made by reissue.

BACKGROUND OF THE INVENTION

The present invention relates to an image display apparatus and, more particularly, to a head- or face-mounted image display apparatus that can be retained on the observer's head or face.

As an example of conventional head- or face-mounted image display apparatus, an image display apparatus disclosed in Japanese Patent Application Unexamined Publication (KOKAI) No. 3-101709 (1991) is known. FIG. 13(a) shows the entire optical system of the conventional image display apparatus, and FIG. 13(b) shows a part of an ocular optical system used in the image display apparatus. As illustrated in these figures, in the conventional image display apparatus, an image that is displayed by an image display device is transmitted as an aerial image by a relay optical system including a positive lens, and the aerial image is projected into an observer's eyeball as an enlarged image by an ocular optical system formed from a concave reflecting mirror.

U.S. Pat. No. 4,669,810 discloses another type of conventional image display apparatus. In this apparatus, as shown in FIG. 14, an image of a CRT is transmitted through a relay optical system to form an intermediate image, and the image is projected into an observer's eye by a combination of a reflection holographic element and a combiner having a hologram surface.

Japanese Patent Application Unexamined Publication (KOKAI) No. 62-214782 (1987) discloses another type of conventional image display apparatus. As shown in FIGS. 15(a) and 15(b), the conventional image display apparatus is designed to enable an image of an image display device to be directly observed as an enlarged image through an ocular lens.

U.S. Pat. No. 4,026,641 discloses another type of conventional image display apparatus. In the conventional image display apparatus, as shown in FIG. 16, an image of an image display device is transferred to a curved object surface by an image transfer device, and the image transferred to the object surface is projected in the air by a toric reflector.

U.S. Reissued Pat. No. 27,356 discloses another type of conventional image display apparatus. As shown in FIG. 17, the apparatus is an ocular optical system designed to project an object surface onto an exit pupil by a semitransparent concave mirror and a semitransparent plane mirror.

Other known image display apparatuses include those which are disclosed in U.S. Pat. Nos. 4,081,209, 4,969,724 and 5,000,544.

In image display apparatuses of the type wherein an image of an image display device is relayed, as shown in FIGS. 13(a), 13(b) and 14, aberration produced by the ocular optical system can be corrected by the relay optical system, and it is possible to effect favorable aberration correction in the optical system as a whole. However, several lenses must be used as the relay optical system in addition to the ocular optical system. Consequently, the optical path length increases, and the optical system increases in both size and weight.

In a case where only the ocular optical system shown in FIG. 13(a) is used, as shown in FIG. 13(b), positive power resides in only the reflecting surface that has a concave surface directed toward the observer. Therefore, large negative field curvature is produced as shown by reference character P1 in the figure.

In a layout such as that shown in FIG. 15, the amount to which the apparatus projects from the observer's face undesirably increases. Further, because an image display device and an illumination optical system are attached to the projecting portion of the apparatus, the apparatus becomes increasingly large in size and heavy in weight.

Because a head-mounted image display apparatus is fitted to the human body, particularly the head, if the amount to which the apparatus projects from the user's face is large, the distance from the supporting point on the head to the center of gravity of the apparatus is long. Consequently, the weight of the apparatus is imbalanced when the apparatus is fitted to the observer's head. Further, when the observer moves or turns with the apparatus fitted to his/her head, the apparatus may collide with something.

That is, it is important for a head-mounted image display apparatus to be small in size and light in weight. An essential factor in determining the size and weight of the apparatus is the arrangement of the optical system.

However, if an ordinary reflecting concave magnifier alone is used as an ocular optical system, exceedingly large aberrations are produced, and there is no device for correcting them. Even if axial spherical aberration can be corrected by forming the configuration of the concave surface of the magnifier into an aspherical surface, off-axis aberrations such as coma, field curvature and astigmatism remain. Therefore, if the field angle is increased, the image display apparatus becomes impractical. Alternatively, if a concave mirror alone is used as an ocular optical system, it is necessary to use not only ordinary optical elements (lens and mirror) but also a device for correcting field curvature by an image transfer device (fiber plate) having a surface which is curved in conformity to the field curvature produced, as shown in FIG. 16.

In a coaxial ocular optical system in which an object surface is projected onto an observer's pupil by using a semitransparent concave mirror and a semitransparent plane mirror, as shown in FIG. 17, because two semitransparent surfaces are used, the brightness of the image is reduced to as low a level as 1/16, even in the case of a theoretical value. Further, because field curvature that is produced by the semitransparent concave mirror is corrected by curving the object surface itself, it is difficult to use a flat display, e.g., an LCD (Liquid Crystal Display), as an image display device.

SUMMARY OF THE INVENTION

In view of the above-described problems of the conventional techniques, an object of the present invention is to provide an image display apparatus which enables observation of a clear image at a wide field angle with substantially no reduction in the brightness of the observation image, and which is extremely small in size and light in weight.

To attain the above-described object, the present invention provides an image display apparatus which includes an image display device for displaying an image, and an ocular optical system for projecting the image displayed by the image display device and for leading the projected image to an observer's eyeball. The ocular optical system has at least three optical surfaces, and a space formed by the at least three optical surfaces is filled with a medium having a refractive index larger than 1. The at least three optical surfaces are defined as a first surface, a second surface, and a third surface, respectively, in the order in which light rays pass in backward ray tracing from the observer's eyeball to the image display device. The at least three optical surfaces are disposed such that light rays from the observer's eyeball pass through the first surface and are reflected by the second surface and further reflected by the third surface, which is a reflecting surface having positive power, and the light rays reflected by the third surface are reflected by the first surface and pass through the second surface to reach the image display device.

In this case, the reflection at the first surface is preferably total reflection.

In addition, the present invention provides an image display apparatus which includes an image display device for displaying an image, and an ocular optical system for projecting the image displayed by the image display device and for leading the projected image to an observer's eyeball. The ocular optical system has at least four optical surfaces, and a space formed by the at least four optical surfaces is filled with a medium having a refractive index larger than 1. The at least four optical surfaces are defined as a first surface, a second surface, a third surface, and a fourth surface, respectively, in the order in which light rays pass in backward ray tracing from the observer's eyeball to the image display device. The at least four optical surfaces are disposed such that the light rays from the observer's eyeball pass through the first surface and are reflected by the second surface and further reflected by the third surface, which is a reflecting surface having positive power, and the light rays reflected by the third surface are reflected by the first surface and pass through the fourth surface to reach the image display device.

The operation of the above-described image display apparatus according to the present invention will be explained below. The following explanation will be made on the basis of backward ray tracing in which light rays are traced from the observer's pupil position toward the image display device for the convenience of designing the optical system.

In the present invention, a space that is formed by the first, second and third surfaces of the ocular optical system is filled with a medium having a refractive index larger than 1, thereby making it possible to correct spherical aberration, coma and field curvature produced by the third surface, which is decentered and tilted, and thus succeeding in providing the observer with a clear observation image having a wide exit pupil diameter and a wide field angle.

Concave mirrors generally have such nature that, if strong power is given to the concave surface, Petzval sum increases, and positive field curvature is produced. When the pupil position is far away from the curvature center of the concave mirror, negative comatic aberration is produced. However, in order to provide an image display apparatus which is compact and yet provides a wide field angle, it is important to enlarge an image of a small image display device by an optical system which has a short focal length, that is, strong positive power.

The present invention meets the inconsistent demands that the image display apparatus should be compact and provide a wide field angle and yet have minimal aberration by filling the space formed by the first, second and third surfaces with a medium having a refractive index larger than 1.

By filling the space formed by the three surfaces with a medium having a refractive index larger than 1, it becomes possible to effectively use the space where light rays pass through the first surface when entering the ocular optical system and pass through the second surface when emanating from the ocular optical system. In this case, light rays from the pupil are convergently refracted by the first surface. Therefore, it is possible to suppress the divergence of light rays in the optical system and prevent vignetting of light rays.

In addition it is possible to minimize the height at which extra-axial principal and subordinate rays are incident on the third surface. Consequently, it is possible to minimize the effective apertures of the second and third surfaces and to reduce the size of the ocular optical system. At the same time, field curvature is reduced, and it becomes possible to widen the field angle. Further, the optical path length between the concave mirror and the pupil position can be made longer than the mechanical length. In other words, the pupil position can be set away from the optical system to obtain a relatively long eye point, and yet, optically, the pupil can be disposed in the vicinity of the curvature center of the concave mirror. Thus, it is possible to reduce comatic aberration produced by the third surface.

In the present invention, after passing through the first surface, light rays are reflected by the second surface and further reflected by the third surface, which has positive power. Thereafter, the light rays are reflected by the first surface and pass through the second surface. Accordingly, the optical path can be bent in a compact form in an optical element having small volumetric capacity.

In the optical system, because a principal surface having positive refractive power is formed from a reflecting surface, chromatic aberration produced in the optical system is minimized in theory. Accordingly, it is unnecessary to correct chromatic aberration by using glass materials having different Abbe's numbers. Thus, it becomes possible to form the optical system of a single vitreous material.

If the system is arranged such that the light rays reflected by the third surface are totally reflected by the first surface, the size of the ocular optical system can be effectively reduced. This will be explained below in detail.

FIGS. 11(a) and 11(b) are sectional views each illustrating an optical path in the image display apparatus according to the present invention. FIG. 11(a) shows an ocular optical system in which a first surface 3 does not totally reflect light rays. FIG. 11(b) shows an ocular optical system in which total reflection occurs at a first surface 3. In these sectional views, reference numeral 1 denotes an observer's pupil position, 2 an observer's visual axis, 3 a first surface of the ocular optical system, 4 a second surface of the ocular optical system, 5 a third surface of the ocular optical system, and 7 an image display device. In FIG. 11(a), an internally reflecting region M of the first surface 3 has been mirror-coated. The other region of the first surface 3 is a region having no mirror coating.

In backward ray tracing, light rays coming out of the pupil 1 enter the first surface 3 of the ocular optical system. The incident light rays are refracted by the first surface 3 and then reflected by the second surface 4. The reflected light rays are further reflected by the third surface 5. In the arrangement shown in FIG. 11(a), there is no overlap between a reflecting region of the first surface 3 where lower extra-axial light rays L are reflected and a transmitting region of the first surface 3 where the lower extra-axial light rays L pass. Therefore, it is necessary to increase the height of the ocular optical system. That is, when the reflecting region and the transmitting region are formed separately from each other, it is difficult to form a compact optical system.

In other words, if the size of the ocular optical system is kept constant, it is possible to widen the field angle for observation, particularly the vertical field angle, by dividing the transmitting and reflecting regions from each other.

Therefore, the ocular optical system according to the present invention is arranged such that, as shown in FIG. 11(b), the transmitting region of the first surface 3 for light rays including upper extra-axial light rays U and lower extra-axial light rays L and the reflecting region of the first surface 3 for light rays including upper extra-axial light rays U and lower extra-axial light rays L are approximately coincident with each other, thereby succeeding in reducing the size of the optical system.

If the internal reflection at the first surface 3 satisfies the condition for total reflection, the first surface 3 need not be mirror-coated. Therefore, even if a ray bundle passing through the first surface 3 and a ray bundle reflected by the first surface 3 interfere with each other at the first surface 3, the light rays can perform their original functions.

It is preferable to dispose the third surface 5 such that, after being reflected by the second surface 4, light rays on the observer's visual axis 2 are tilted at approximately 30° toward the observer's eyeball by reflection at the third surface 5. At the third surface 5, which is a concave mirror having positive power, as the reflection angle becomes larger, comatic aberration due to decentration occurs to a larger extent. Conversely, if the angle of reflection at the third surface 5 is not sufficiently large, the light rays reflected by the third surface 5 cannot be internally reflected by the first surface 3.

In order that the light rays reflected by the third surface 5 shall be reflected by the first surface 3 with a practically admitted amount of aberration, it is desirable to dispose the third surface 5 such that the above-described tilt angle is approximately 30°.

It is more desirable to satisfy the following condition:

$$20° < \theta_1 < 45° \quad (1)$$

where $\theta_1$ is the tilt angle of the light rays.

The condition (1) shows practical limits of the condition for attaining the above-described purposes. If $\theta_1$ is not larger than the lower limit of the condition (1), i.e. 20°, as shown in the sectional view of FIG. 12, light rays reflected by the third surface 5 cannot be reflected by the first surface 3; the reflected light rays undesirably return to and pass through the second surface 4. In this case, the second surface 4 must be formed by using a semitransparent surface, and the transmittance of the optical system undesirably reduces. If $\theta_1$ is not smaller than the upper limit of the condition (1), i.e. 45°, comatic aberration is produced by the third surface 5 becomes excessively large and hence impossible to correct by another surface.

In order to minimize the optical path passing through the prism constituting the ocular optical system and to make the whole optical system even more compact, it is desirable to restrict the range defined by the condition (1) to the range defined by the following condition (1'):

$$25° < \theta_1 < 40° \quad (1')$$

It is also desirable to satisfy the following condition:

$$30° < \theta_2 < 60° \quad (2)$$

wherein $\theta_2$ is the angle between the first and second surfaces 3 and 4.

If $\theta_2$ is not smaller than the upper limit of the condition (2), i.e. 60°, the optical path extending through the prism of the ocular optical system becomes excessively long, resulting unfavorably in an increase in size of the prism. If $\theta_2$ is not larger than the lower limit of the condition (2), i.e. 30°, because $\theta_2$ is closely related to $\theta_1$, $\theta_1$ becomes undesirably large, causing aberration produced by the concave mirror 5 to become large and impossible to correct by another surface satisfactorily.

It is more desirable that the internal reflection at the second surface 4 should be total reflection. By tilting the second surface 4 such that total reflection takes place at the second surface 4, it becomes unnecessary to provide reflection coating on the second surface 4. If the second surface 4 is disposed so as to pass light rays totally reflected by the first surface 3, it is unnecessary to separate reflecting and transmitting regions from each other as is the case with the first surface 3. Accordingly, the ocular optical system can be reduced in size. In the case of total reflection, a reflectivity of 100% can be obtained; in the case of reflection by coating, only a reflectivity of about 90% can be obtained.

Next, the image display apparatus according to the second aspect of the present invention will be explained. The image display apparatus is characterized in that an area that is surrounded by four optical surfaces is filled with a medium having a refractive index larger than 1. In the image display apparatus according to the first aspect of the present invention, light rays pass through the second surface, which serves as both reflecting and transmitting surfaces, before reaching the image display device, whereas in the image display apparatus according to the second aspect of the present invention, a fourth surface which serves as only a transmitting surface is provided, thereby enabling even more favorable aberration correction.

In this case also, it is desirable that internal reflection at the first surface after reflection at the third should be total reflection. It is also desirable to dispose the third surface such that, after being reflected by the second surface, light rays on the observer's visual axis are tilted at approximately 30° toward the observer's eyeball by reflection at the third surface. It is preferable to satisfy the following condition:

$$20° < \theta_1 45° \quad (1)$$

where $\theta_1$ is the tilt angle of the light rays.

It is even more desirable to restrict the range defined by the condition (1) to the range defined by the following condition (1'):

$$25° < \theta_1 < 40° \quad (1')$$

It is also desirable to satisfy the following condition:

$$30° < \theta_2 < 60° \quad (2)$$

where $\theta_2$ is the angle between the first and second surfaces 3 and 4.

In the decentered optical element (prism) in the image display apparatus according to the second aspect of the present invention, the second and third surfaces, together with the first surface as it causes internal reflection, are reflecting surfaces. Therefore, no chromatic aberration is produced at these surfaces.

Further, at the third or fourth surface, which lies in close proximity to the image display device, principal rays are approximately parallel to the optical axis. Therefore, the third or fourth surface produces minimal lateral chromatic aberration. Consequently, chromatic aberration in the ocular optical system is produced by only the first surface, which is a refracting surface. Thus, the chromatic aberration in the ocular optical system can be substantially ignored. However, it is more desirable to correct lateral chromatic aberration produced by the first surface, and it is possible to display an image which is clearer and of higher resolution by correcting the lateral chromatic aberration. Accordingly, the ocular optical system is preferably arranged such that a decentered optical element, together with at least one optical surface having refracting action, is disposed between the observer's eyeball and the image display device. By doing so, optical elements constituting the ocular optical system can be composed of two or more different mediums, and it becomes possible to correct the lateral chromatic aberration by virtue of the difference in Abbe's number between these mediums.

Chromatic aberration produced by the first surface can be corrected by forming the above-described at least one optical surface from a surface which produces chromatic aberration which is approximately equal in quantity but opposite in sign to the chromatic aberration produced by the first surface. That is, it is desirable to dispose at least one optical boundary surface in the optical path of the ocular optical system.

The correction of chromatic aberration will be explained below more specifically. By disposing a decentered optical element, together with at least one optical surface having refracting action, in the optical path extending from the image display device to the observer's eyeball, the ocular optical system can be composed of two or more different mediums. In this case, lateral chromatic aberration can be corrected by virtue of the Abbe's number difference between the different mediums. Conditions for the correction of lateral chromatic aberration, which are generally known as achromatic conditions, are satisfied by appropriately selecting Abbe's numbers $v_1$ and $v_2$.

It should be noted that it becomes possible for the observer to see a stable observation image by providing a device for positioning both the image display device and the ocular optical system with respect to the observer's head.

By allowing both the image display device and the ocular optical system to be fitted to the observer's head with a supporting device, it becomes possible for the observer to see the observation image in a desired posture and from a desired direction. That is, the observer can see the observation image in his/her own easy posture. For example, even a sick person who is bedridden can see the observation image in a lying position with the image display apparatus fitted to his/her head.

Further, it becomes possible for the observer to see the observation image with both eyes without fatigue by providing a device for supporting at least two image display apparatuses at a predetermined spacing. Further, if images with a disparity therebetween are displayed on the image display areas of the right and left image display devices, and these images are observed with both eyes, it is possible to enjoy viewing a stereoscopic image.

Further, if an ocular optical system according to the present invention is arranged to form an image of an object at infinity with the image display device surface in the ocular optical system defined as an image surface, the optical system can be used as an imaging optical system, e.g. a finder optical system of a camera, as shown in FIGS. 9 and 10.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 7 of the image display apparatus according to the present invention will be described below with reference to FIGS. 1 to 7, which are sectional views of image display apparatuses designed for a single eye according to Examples 1 to 7.

Figure 1:
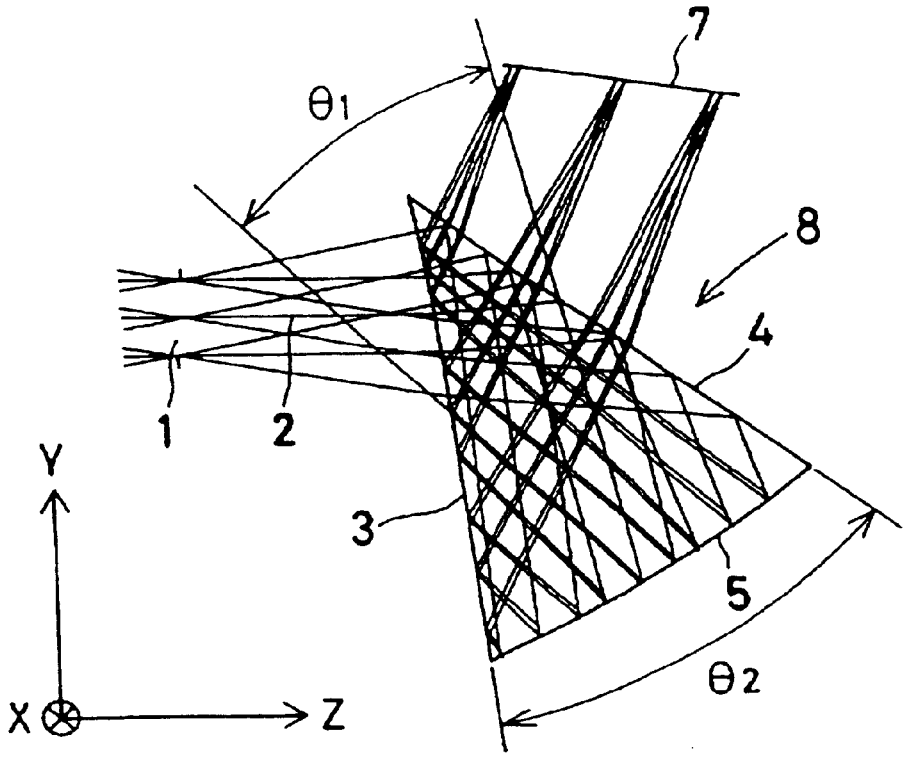
FIG. 1 illustrates an optical ray trace of Example 1 of an image display apparatus according to the present invention.
Figure 2:
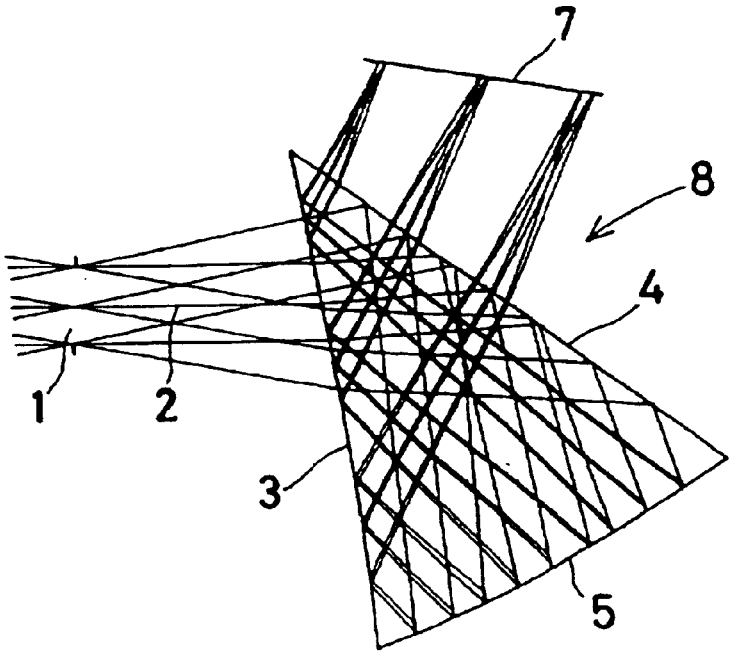
FIG. 2 illustrates an optical ray trace of Example 2 of an image display apparatus according to the present invention.
Figure 3:
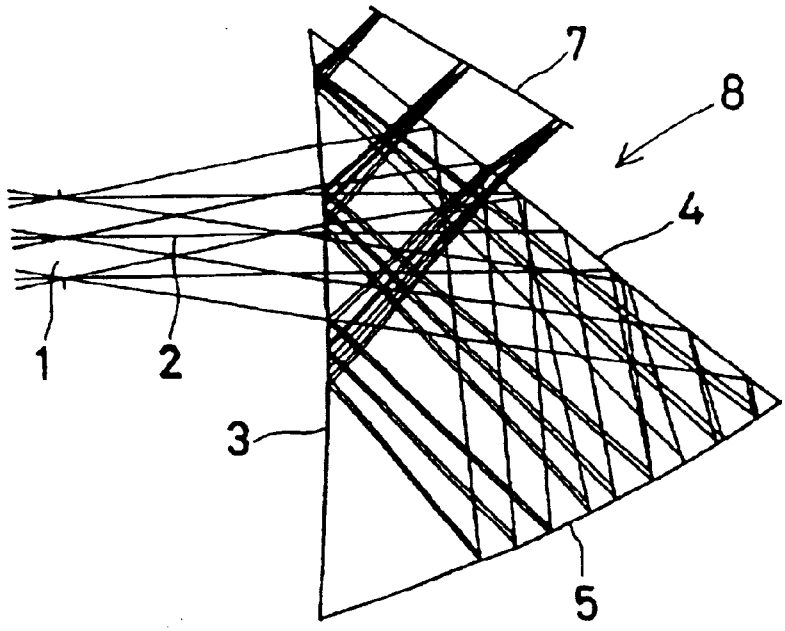
FIG. 3 illustrates an optical ray trace of Example 3 of an image display apparatus according to the present invention.
Figure 4:
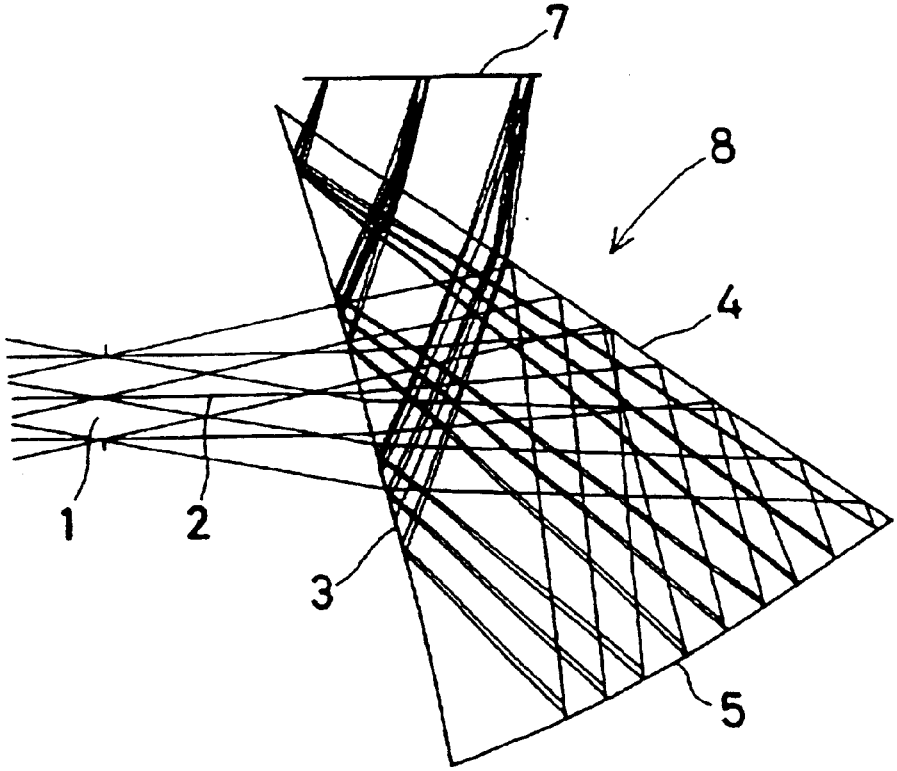
FIG. 4 illustrates an optical ray trace of Example 4 of an image display apparatus according to the present invention.
Figure 5:
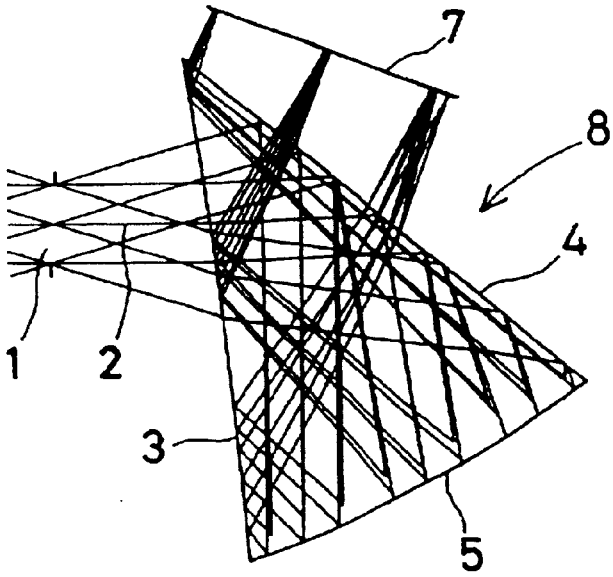
FIG. 5 illustrates an optical ray trace of Example 5 of an image display apparatus according to the present invention.
Figure 6:
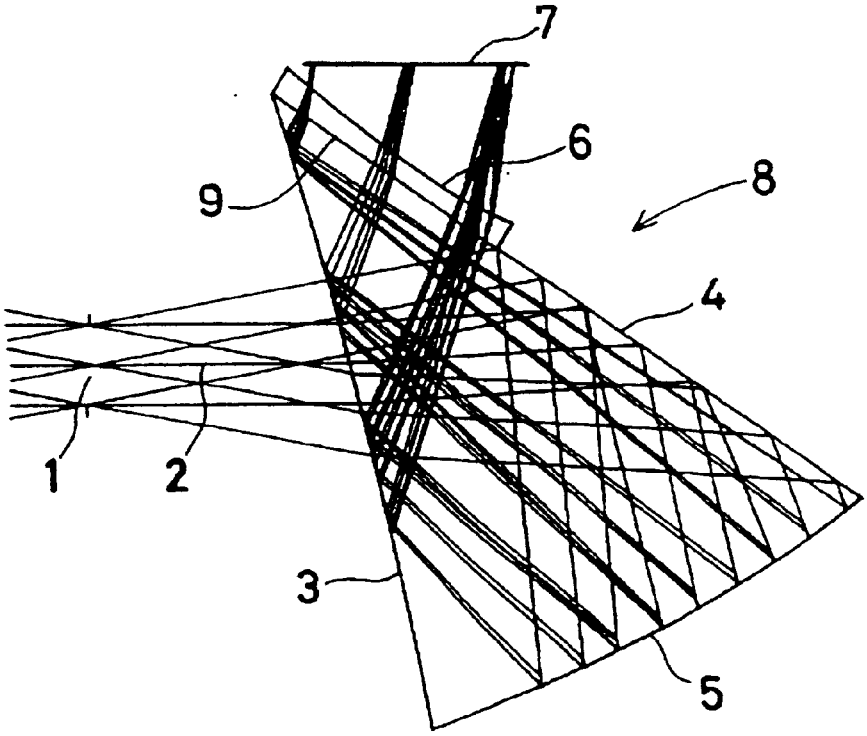
FIG. 6 illustrates an optical ray trace of Example 6 of an image display apparatus according to the present invention.
Figure 7:
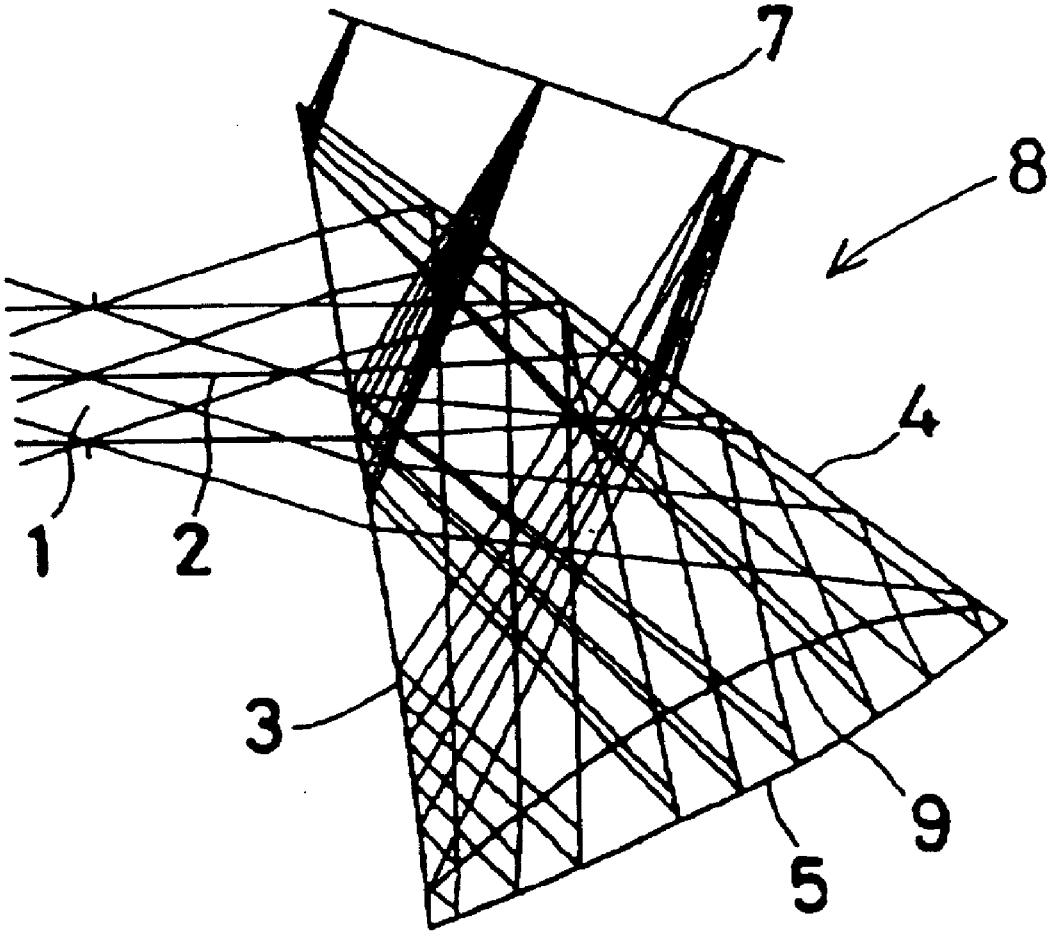
FIG. 7 illustrates an optical ray trace of Example 7 of an image display apparatus according to the present invention.

Constituent parameters in Examples 1 to 5 will be shown later. In the following description, the surface Nos. are shown as ordinal numbers in backward tracing from an observer's pupil position 1 toward an image display device 7. A coordinate system is defined as follows: As shown in FIG. 1, with the observer's iris position 1 defined as the origin, the direction of an observer's visual axis 2 is taken as Z-axis, where the direction toward an ocular optical system 8 from the origin is defined as positive direction, and the vertical direction (as viewed from the observer's eyeball) which perpendicularly intersects the observer's visual axis 2 is taken as Y-axis, where the upward direction is defined as position direction. Further, the horizontal direction (as viewed from the observer's eyeball) which perpendicularly intersects the observer's visual axis 2 is taken as X-axis, where the leftward direction is defined as positive direction. That is, the plane of the figure is defined as YZ-plane, and a plane which is perpendicular to the plane of the figure is defined as XZ-plane. Further, it is assumed that the optical axis is bent in the YZ-plane, which is parallel to the plane of the figure.

In the constituent parameters (shown later), the surface No. 2 is given a surface separation, which is the distance from the surface No. 1 along the Z-axis, and a point on the surface No. 2 that lies on the Z-axis is defined as a reference point for the surface No. 2 and the surfaces following it. The surface No. 2 and the surfaces following it are each given eccentricities Y and Z and a tilt angle θ. The eccentricity Y is a distance by which the vertex of each particular surface decenters in the Y-axis direction from the reference point. The eccentricity Z is a distance by which the vertex of each particular surface decenters in the Z-axis direction from the reference point. The tilt angle θ is an inclination angle of the center axis of each particular surface relative to the Z-axis. Regarding the tilt angle θ, it is positive when the rotation is counterclockwise. It should be noted that the surface of the image display device 7 is also given eccentricities Y and Z and a tilt angle θ. In the case of the image display device 7, the eccentricity Y is a distance by which the center of the display surface decenters in the Y-axis direction from the center of the surface No. 1 (i.e. the observer's pupil position 1), and the eccentricity Z is a distance by which the center of the display surface decenters in the Z-axis direction from the center of the surface No. 1. The tilt angle θ is an inclination angle of a line normal to the display surface relative to the Z-axis. Regarding the surface separation, the direction of backward ray tracing along the optical axis is defined as positive direction.

The non-rotationally symmetric aspherical configuration of each surface may be expressed in the coordinate system defining the surface as follows:

$$Z = [(X^2/R_x) + (Y^2/R_y)]/\left[1 + \{1 - (1+K_x)(X^2/R_x^2) - (1+K_y)(Y^2/R_y^2)\}^{1/2}\right] + AR[(1-AP)X^2 + (1+AP)Y^2]^2 + BR[(1-BP)X^2 + (1+BP)Y^2]^2$$

where $R_y$ is the paraxial curvature radius of each surface in the YZ-plane (the plane of the figure); $R_x$ is the paraxial curvature radius in the XZ-plane; $K_x$ is the conical coefficient in the XZ-plane; $K_y$ is the conical coefficient in the YZ-plane; AR and BR are 4th- and 6th-order aspherical coefficients, respectively, which are rotationally symmetric with respect to the Z-axis; and AP and BP are 4th- and 6th-order aspherical coefficients, respectively, which are rotationally asymmetric with respect to the Z-axis.

The rotationally symmetric aspherical configuration of each surface may be expressed by.

$$Z=[(h^2/R)/[1+\{1-(1+K)(h^2/R^2)\}^{1/2}]+Ah^4+Bh^6$$

where R is the paraxial curvature radius; K is the conical coefficient; A and B are 4th- and 6th-order aspherical coefficients, respectively; and h is given by $h^2=X^2+y^2$.

It should be noted that the refractive index of the medium between a pair of adjacent surfaces is expressed by the refractive index for the spectral d-line. Lengths are given in millimeters.

The following examples are all image display apparatuses for the right eye. An image display apparatus for the left eye can be realized by disposing the constituent optical elements of each example in symmetrical relation to the apparatus for the right eye with respect to the YZ-plane.

In an actual apparatus, needless to say, the direction in which the optical axis is bent by the ocular optical system may be any of the upward, downward and sideward directions of the observer.

In each sectional view, reference numeral 1 denotes an observer's pupil position, 2 an observer's visual axis, 3 a first surface of an ocular optical system, 4 a second surface of the ocular optical system, 5 a third surface of the ocular optical system, 6 a fourth surface of the ocular optical system, 7 an image display device, 8 an ocular optical system, and 9 an optical surface.

The actual path of light rays in each example is as follows: In Example 1, for instance, a bundle of light rays emitted from the image display device 7 enters the ocular optical system 8 while being refracted by the second surface 4 of the ocular optical system 8 and is internally reflected by the first surface 3 and then reflected by the third surface 5. Then, the ray bundle is reflected by the second surface 4 again and then refracted by the first surface 3 so as to be projected into the observer's eyeball with the observer's iris position or eyeball rolling center as the exit pupil 1.

EXAMPLE 1

This example relates to an image display apparatus according to the first aspect of the present invention. As shown in the sectional view of FIG. 1, the horizontal field angle is 30°, while the vertical field angle is 22.7°, and the pupil diameter is 8 millimeters. In the constituent parameters (shown later), the first surface 3 (surface Nos. 2 and 5), the second surface 4 (surface Nos. 3 and 6), and the third surface 5 (surface No. 4) are all spherical surfaces.

EXAMPLE 2

This example relates to an image display apparatus according to the first aspect of the present invention. As shown in the sectional view of FIG. 2, the horizontal field angle is 30°, while the vertical field angle is 22.7°, and the pupil diameter is 8 millimeters. In the constituent parameters (shown later), the first surface 3 (surface Nos. 2 and 5) and the second surface 4 (surface Nos. 3 and 6) are spherical surfaces, and the third surface 5 (surface No. 4) is an anamorphic aspherical surface.

EXAMPLE 3

This example relates to an image display apparatus according to the first aspect of the present invention. As shown in the sectional view of FIG. 3, the horizontal field angle 30°, while the vertical field angle is 22.7°, and the pupil diameter is 8 millimeters. In the constituent parameters (shown later), the first surface 3 (surface Nos. 2 and 5) and the third surface 5 (surface No. 4) are anamorphic aspherical surfaces, and the second surface 4 (surface Nos. 3 and 6) is a spherical surface.

EXAMPLE 4

This example relates to an image display apparatus according to the first aspect of the present invention. As shown in the sectional view of FIG. 4, the horizontal field angle is 30°, while the vertical field angle is 22.7°, and the pupil diameter is 8 millimeters. In the constituent parameters (shown later), the first surface 3 (surface Nos. 2 and 5), the second surface 4 (surfaces Nos. 3 and 6), and the third surface 5 (surface No. 4) are all spherical surfaces.

EXAMPLE 5

This example relates to an image display apparatus according to the first aspect of the present invention. As shown in the sectional view of FIG. 5, the horizontal field angle is 45°, while the vertical field angle is 34.52°, and the pupil diameter is 8 millimeters. In the constituent parameters (shown later), the first surface 3 (surface Nos. 2 and 5) and the second surface 4 (surfaces Nos. 3 and 6) are spherical surfaces, and the third surface 5 (surface No. 4) is an anamorphic aspherical surface.

EXAMPLE 6

This example relates to an image display apparatus according to the second aspect of the present invention. As shown in the sectional view of FIG. 6, an optical boundary surface 9 is disposed on the entrance side of the fourth surface 6 of the ocular optical system 8, thereby correcting lateral chromatic aberration. Description of constituent parameters in this example is omitted.

EXAMPLE 7

This example relates to an image display apparatus according to the first aspect of the present invention. As shown in the sectional view of FIG. 7, an optical boundary surface 9 is disposed on the entrance-exit side of the third surface 5 of the ocular optical system 8, thereby correcting lateral chromatic aberration. Description of constituent parameters in this example is omitted.

Constituent parameters in the above-described Examples 1 to 5 are as follows:

| Surface No. | Radius of curvature | Surface separation | Refractive index (Eccentricity) | Abbe's No. (Tilt angle) |
|---|---|---|---|---|
| 1 | ∞ (pupil) | 29.409 | | |
| 2 | −1065.772 | | 1.51633<br>Y −32.663 θ<br>Z 0.277 | 64.10<br>7.273° |
| 3 | 4956.938 | | 1.51633<br>Y 17.403 θ<br>Z −13.120 | 64.10<br>53.107° |
| 4 | 133.057 | | 1.51633<br>Y −44.740 θ<br>Z −30.773 | 64.10<br>98.811° |
| 5 | −1065.772 | | 1.51633<br>Y −32.663 θ<br>Z 0.277 | 64.10<br>7.273° |
| 6 | 4956.938 | | Y 17.043 θ<br>Z −13.120 | 53.107° |
| 7 | (display device) | | Y 23.253 θ<br>Z 44.479 | 81.241° |

$^{(1)}\theta_1 = 32°$
$^{(2)}\theta_2 = 45°$

| Surface No. | Radius of curvature | Surface separation | Refractive index (Eccentricity) | Abbe's No. (Tilt angle) |
|---|---|---|---|---|
| 1 | ∞ (pupil) | 29.908 | | |
| 2 | −1144.435 | | 1.51633<br>Y −35.014 θ<br>Z −0.359 | 64.10<br>6.519° |

-continued

| Surface No. | Radius of curvature | Surface separation | Refractive index (Eccentricity) | Abbe's No. (Tilt angle) |
|---|---|---|---|---|
| 3 | −2248.872 | | 1.51633<br>Y 18.501 θ<br>Z −11.257 | 64.10<br>52.669° |
| 4 | | | | |
| $R_y$ | 147.243 | | 1.51633 | 64.10 |
| $R_x$ | 140.017 | | Y −44.195 θ | 98.410° |
| $K_y$ | −0.065527 | | Z −31.524 | |
| $K_x$ | 0.782804 | | | |
| AR | $-0.444399 \times 10^{-8}$ | | | |
| BR | $-0.506063 \times 10^{-12}$ | | | |
| AP | $0.862947 \times 10^{-1}$ | | | |
| BP | $0.748578 \times 10^{-1}$ | | | |
| 5 | −1144.435 | | 1.51633<br>Y −35.014 θ<br>Z −0.359 | 64.10<br>6.519° |
| 6 | −2248.872 | | Y 18.501 θ<br>Z −11.257 | 53.669° |
| 7 | (display device) | | Y 22.812 θ<br>Z 41.504 | 80.398° |

$^{(1)}\theta_1 = 32°$
$^{(2)}\theta_2 = 45°$

| Surface No. | Radius of curvature | Surface separation | Refractive index (Eccentricity) | Abbe's No. (Tilt angle) |
|---|---|---|---|---|
| 1 | ∞ (pupil) | 24.480 | | |
| 2 | | | | |
| $R_y$ | −736.361 | | 1.48700 | 70.40 |
| $R_x$ | −505.846 | | Y −21.744 θ | −2.450° |
| $K_y$ | 0.000000 | | Z 0.000 | |
| $K_x$ | 0.000000 | | | |
| AR | $-0.306697 \times 10^{-7}$ | | | |
| BR | $-0.809687 \times 10^{-10}$ | | | |
| AP | $0.263980 \times 10^{-1}$ | | | |
| BP | $0.574278 \times 10^{-1}$ | | | |
| 3 | −553.259 | | 1.48700<br>Y 23.482 θ<br>Z −4.568 | 70.40<br>53.267° |
| 4 | | | | |
| $R_y$ | 146.168 | | 1.48700 | 70.40 |
| $R_x$ | 128.931 | | Y −42.800 θ | 93.371° |
| $K_y$ | −0.06771 | | Z −31.014 | |
| $K_x$ | −0.407545 | | | |
| AR | $0.550524 \times 10^{-8}$ | | | |
| BR | $-0.151433 \times 10^{-11}$ | | | |
| AP | $-0.155988 \times 10^{-1}$ | | | |
| BP | 0.437690 | | | |
| 5 | | | | |
| $R_y$ | −736.361 | | 1.48700 | 70.40 |
| $R_x$ | −505.846 | | Y −21.744 θ | −2.450° |
| $K_y$ | 0.000000 | | Z 0.000 | |
| $K_x$ | 0.000000 | | | |
| AR | $-0.306697 \times 10^{-7}$ | | | |
| BR | $0.809687 \times 10^{-10}$ | | | |
| AP | $0.263980 \times 10^{1}$ | | | |
| BP | $0.574278 \times 10^{-1}$ | | | |
| 6 | −553.259 | | Y 23.482 θ<br>Z −4.568 | 53.267° |
| 7 | (display device) | | Y 16.438 θ<br>Z 39.101 | 58.428° |

$^{(1)}\theta_1 = 36°$
$^{(2)}\theta_2 = 50°$

| Surface No. | Radius of curvature | Surface separation | | Refractive index (Eccentricity) | | Abbe's No. (Tilt angle) |
|---|---|---|---|---|---|---|
| 1 | ∞ (pupil) | 32.764 | | | | |
| 2 | −677.269 | | | 1.51633 | | 64.10 |
| | | | Y | −57.272 | θ | 8.459° |
| | | | Z | 3.506 | | |
| 3 | 2651.719 | | | 1.51633 | | 64.10 |
| | | | Y | 13.829 | θ | 53.626° |
| | | | Z | 5.278 | | |
| 4 | 137.501 | | | 1.51633 | | 64.10 |
| | | | Y | −41.948 | θ | 101.521° |
| | | | Z | −17.362 | | |
| 5 | −677.269 | | | 1.51633 | | 64.10 |
| | | | Y | −57.272 | θ | 8.459° |
| | | | Z | 3.506 | | |
| 6 | 2651.719 | | Y | 13.829 | θ | 53.626° |
| | | | Z | 5.278 | | |
| 7 | (display device) | | Y | 31.172 | θ | 88.536° |
| | | | Z | 31.427 | | |

(1)$\theta_1 = 32°$
(2)$\theta_2 = 40°$

| Surface No. | Radius of curvature | Surface separation | | Refractive index (Eccentricity) | | Abbe's No. (Tilt angle) |
|---|---|---|---|---|---|---|
| 1 | ∞ (pupil) | 19.348 | | | | |
| 2 | −740.335 | | | 1.51633 | | 64.10 |
| | | | Y | −22.650 | θ | 6.519° |
| | | | Z | −0.232 | | |
| 3 | −1454.796 | | | 1.51633 | | 64.10 |
| | | | Y | 11.969 | θ | 52.669° |
| | | | Z | 0.000 | | |
| 4 | | | | | | |
| $R_y$ | 120.000 | | | 1.5163 | | 64.10 |
| $R_x$ | 90.577 | | Y | −40.000 | θ | 98.410° |
| $K_y$ | −0.065527 | | Z | −20.393 | | |
| $K_x$ | 0.782804 | | | | | |
| AR | $-0.164158 \times 10^{-7}$ | | | | | |
| BR | $-0.446703 \times 10^{-11}$ | | | | | |
| AP | $0.862947 \times 10^{-1}$ | | | | | |
| BP | $0.748578 \times 10^{-1}$ | | | | | |
| 5 | −740.335 | | | 1.51633 | | 64.10 |
| | | | Y | −22.650 | θ | 6.519° |
| | | | Z | −0.232 | | |
| 6 | −1454.796 | | Y | 11.969 | θ | 52.669° |
| | | | Z | 0.000 | | |
| 7 | (display device) | | Y | 17.000 | θ | 70.000° |
| | | | Z | 30.000 | | |

(1)$\theta_1 = 36°$
(2)$\theta_2 = 40°$

Figure 8:
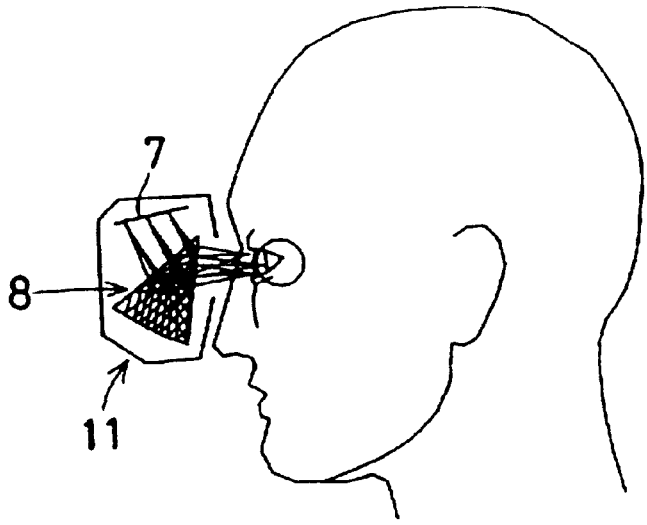
FIGS. 8(a) and 8(b) are sectional and perspective views showing one example of an image display apparatus according to the present invention which is arranged as a head-mounted image display apparatus.
Figure 8:
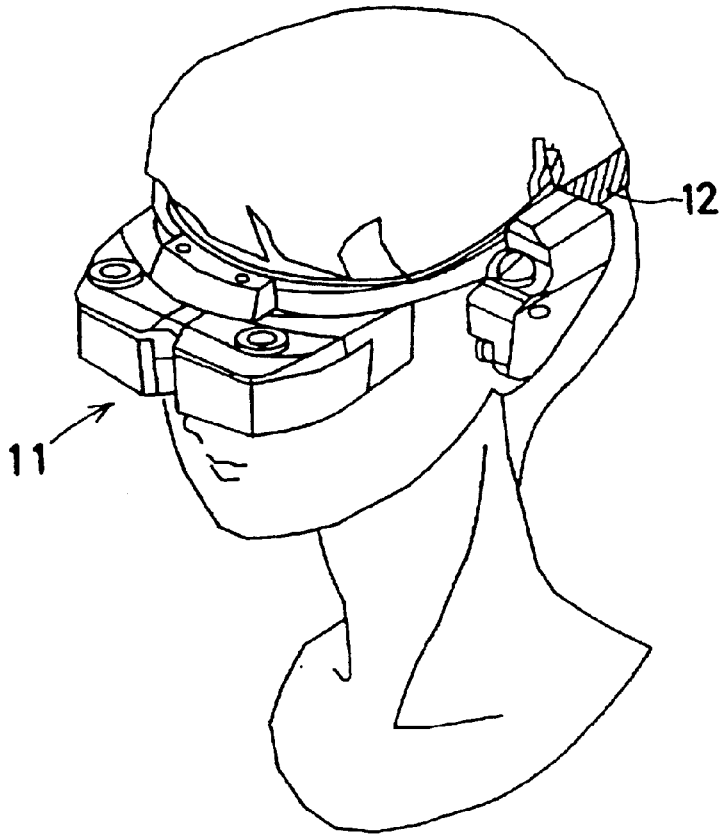

Although examples of the image display apparatus according to the present invention have been described above, it should be noted that the present invention is not necessarily limited to these examples, and that various modifications may be imparted thereto. To arrange the image display apparatus according to the present invention as a head-mounted image display apparatus (HMD) 11, as shown in the sectional view of FIG. 8(a) and the perspective view of FIG. 8(b), the HMD 11 is fitted to the observer's head by using a headband 12, for example, which is attached to the HMD 15.

Figure 9:
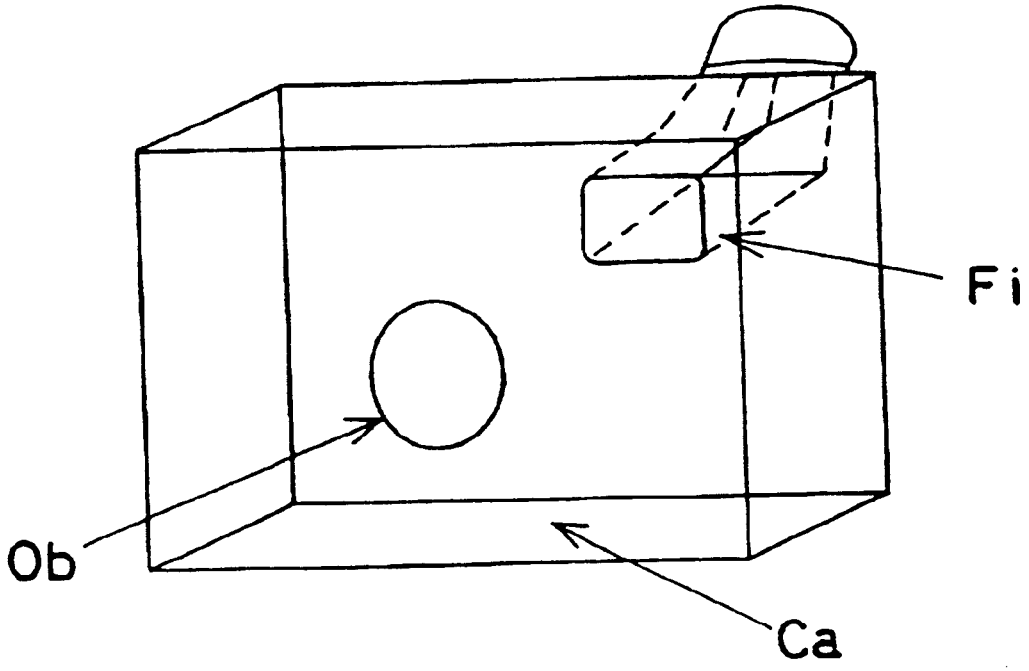
FIG. 9 is a perspective view of a compact camera in which an ocular optical system of an image display apparatus according to the present invention is used as an imaging optical system.
Figure 10:
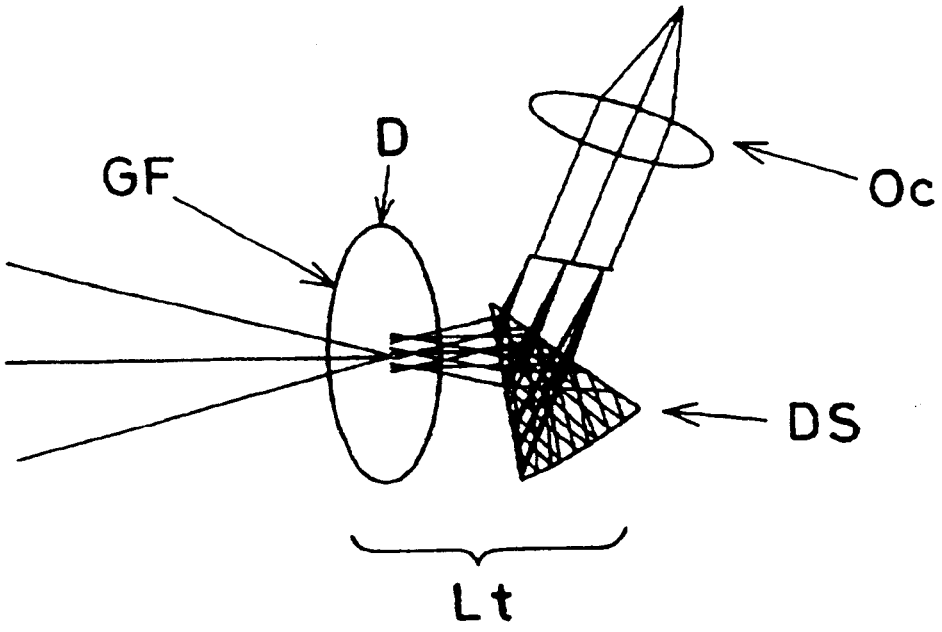
FIG. 10 shows an arrangement in a case where an ocular optical system of an image display apparatus according to the present invention is used as an imaging optical system.
Figure 11A:
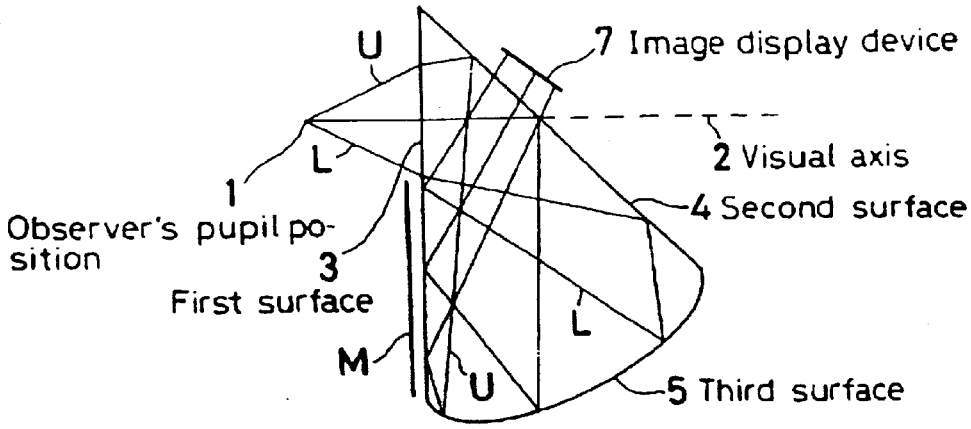
FIGS. 11(a) and 11(b) are conceptual views showing optical paths in an image display apparatus according to the present invention.
Figure 11B:
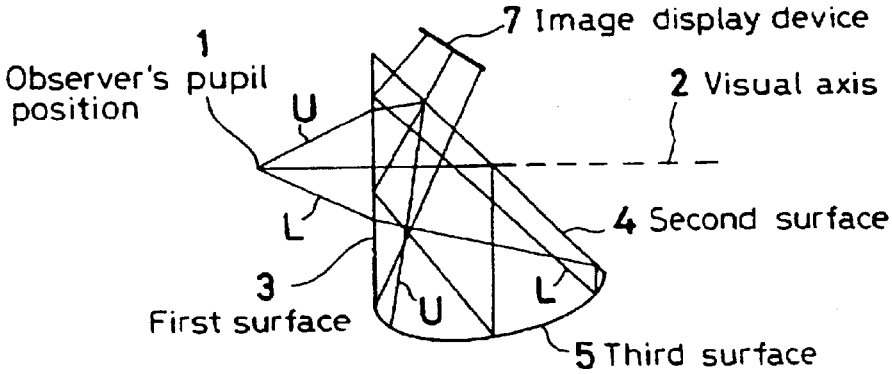
Figure 12:
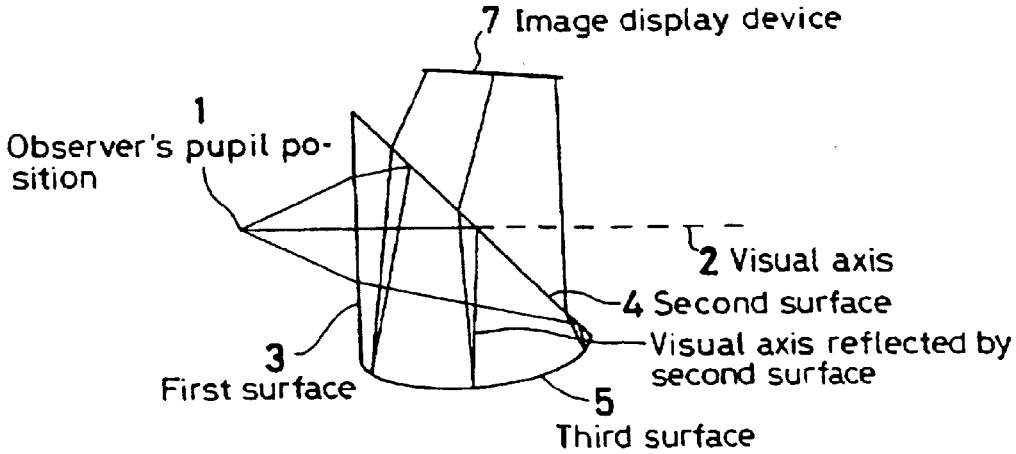
FIG. 12 is a view for explanation of the meaning of the condition (1) in the present invention.
Figure 13:
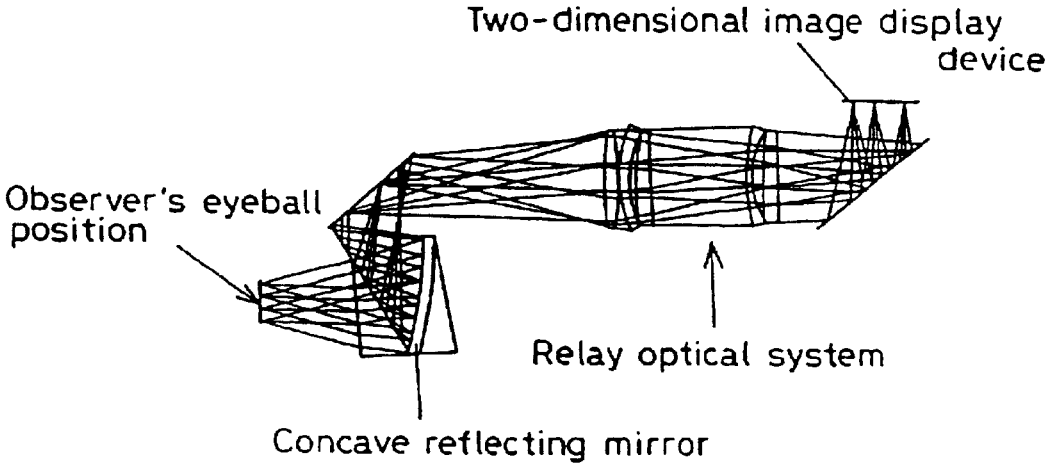
PRIOR ART FIG. 13 (a)
FIGS. 13(a) and 13(b) show an optical system of a conventional image display apparatus.
Figure 13:
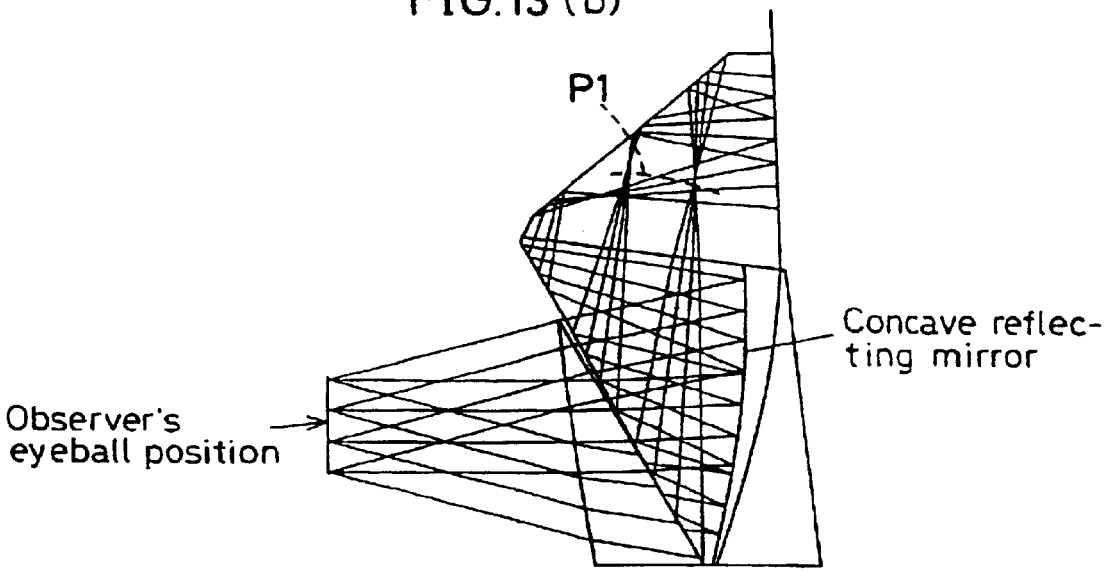
PRIOR ART FIG. 13 (b)
Figure 14:
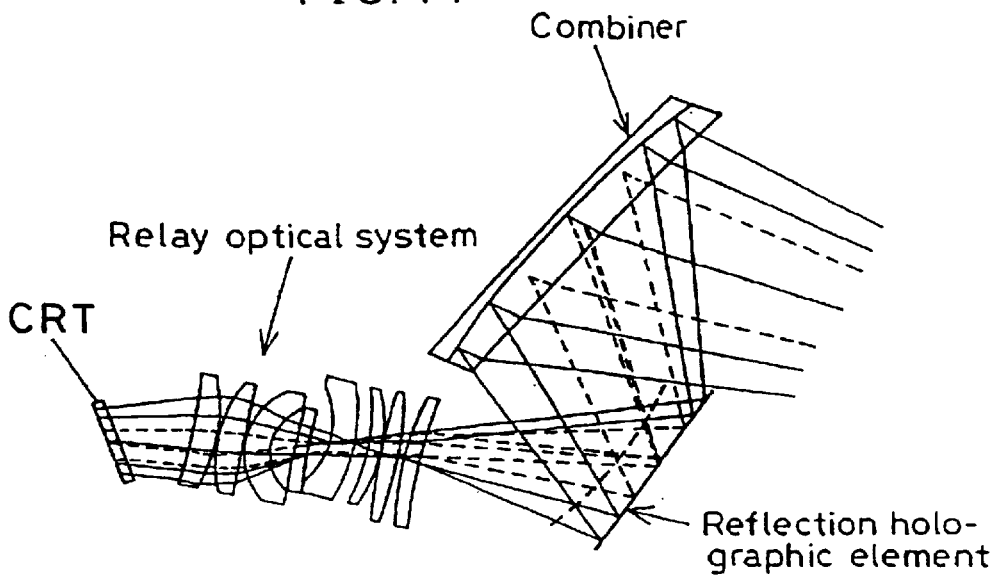
PRIOR ART FIG. 14
FIG. 14 shows an optical system of another conventional image display apparatus.
Figure 15A:
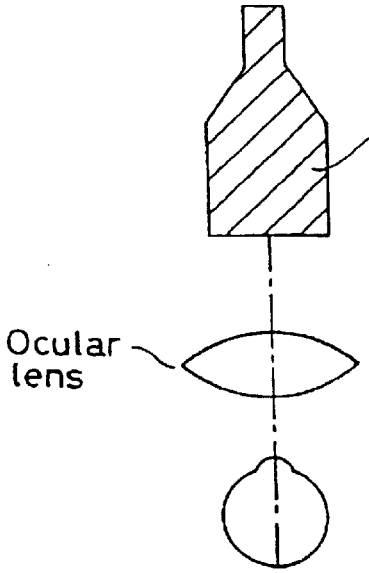
PRIOR ART FIG.15(a)
FIGS. 15(a) and 15(b) show an optical system of still another conventional image display apparatus.
Figure 15B:
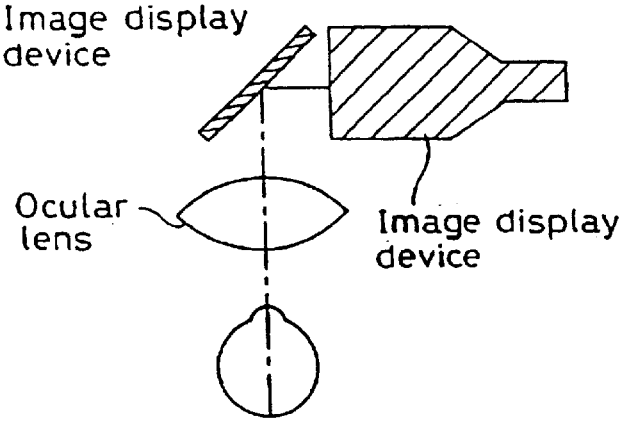
PRIOR ART FIG.15(b)
Figure 16:
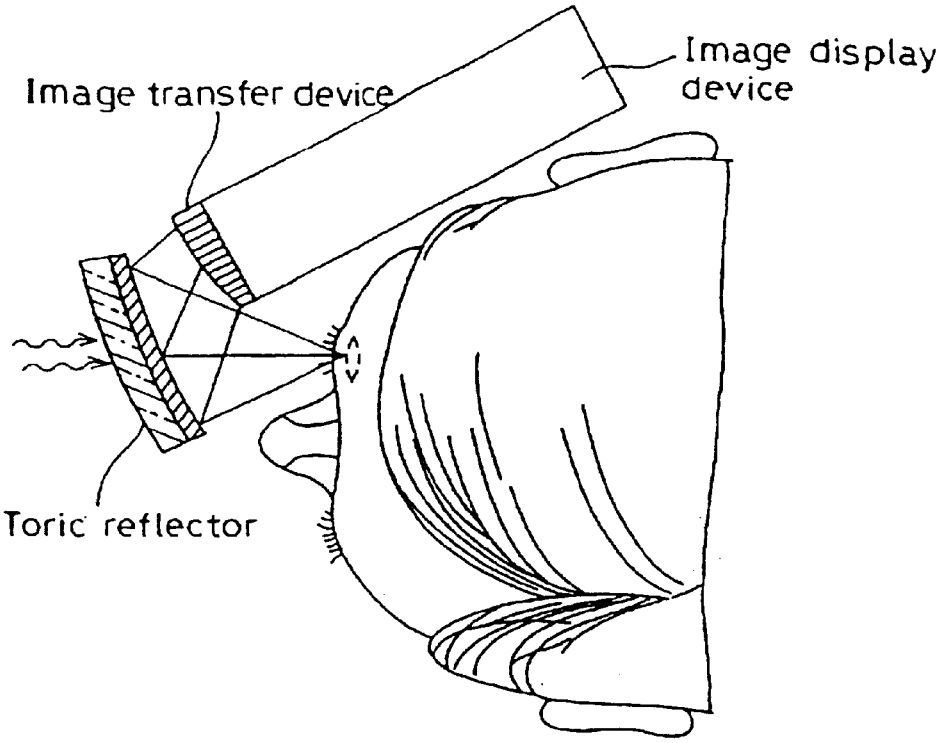
PRIOR ART FIG. 16
FIG. 16 shows an optical system of a further conventional image display apparatus.
Figure 17:
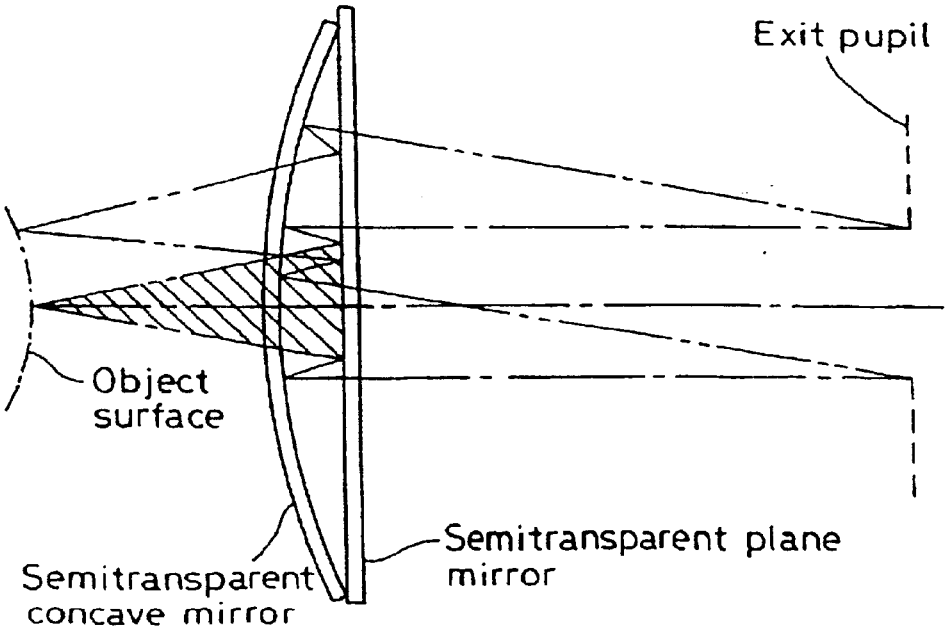
PRIOR ART FIG. 17
FIG. 17 shows an optical system of a still further conventional image display apparatus.

Further, the ocular optical system 8 of the image display apparatus according to the present invention can be used as an imaging optical system. For example, as shown in the perspective view of FIG. 9, the ocular optical system 8 may be used in a finder optical system $F_i$ of a compact camera $C_a$ in which a photographic optical system $O_b$ and the finder optical system $F_i$ are provided separately in parallel to each other. FIG. 10 shows the arrangement of an optical system in a case where an ocular optical system according to the present invention is used as such an imaging optical system. As illustrated, an ocular optical system DS according to the present invention is disposed behind a front lens group GF and an aperture diaphragm D, thereby constituting an objective optical system $L_t$. An image that is formed by the objective optical system $L_t$ can be observed through an ocular lens $O_c$.

Although in some examples an anamorphic aspherical surface is used as a surface configuration from the viewpoint of optical design, surface configurations usable in the present invention are not necessarily limited to those defined by the above-described expressions. It will be apparent that the object of the present invention can be attained by adopting the arrangement of the present invention even in the case of other surfaces, e.g. a three-dimensional surface (free-form surface), a toric surface, etc.

As will be clear from the foregoing description, the present invention makes it possible to provide an image display apparatus which has a wide field angle and is extremely small in size and light in weight.

What we claim is:

1. An image display apparatus comprising an image display device for displaying an image, and an ocular optical system for projecting the image displayed by said image display device and for leading the projected, image to an observer's eyeball, said ocular optical system having at least three optical surfaces, wherein a space formed by said at least three optical surfaces is filled with a medium having a refractive index larger than 1, said at least three optical surfaces being defined as a first surface, a second surface, and a third surface, respectively, in order in which light rays pass in backward ray tracing from said observer's eyeball to said image display device, and said at least three optical surfaces being disposed such that light rays pass in said backward ray tracing from said observer's eyeball pass through the first surface and are reflected by the second surface and further reflected by the third surface, which is a reflecting surface having positive power, and the light rays reflected by said third surface are reflected by said first surface and pass through said second surface to reach said image display device.

2. An image display apparatus according to claim 1, wherein the reflection at said first surface is total reflection.

3. An image display apparatus according to claim 1 or 2, wherein said third surface is disposed such that light rays on an observer's visual axis which have been reflected by said second surface are tilted at approximately 30° toward said observer's eyeball by reflection at said third surface.

4. An image display apparatus according to claim 3, which satisfies the following condition:

$$20° < \theta_1 < 45° \quad (1)$$

where $\theta_1$ is a tilt angle of said light rays.

5. An image display apparatus according to claim 3, which satisfies the following condition:

$$25° < \theta_1 < 40° \quad (1')$$

where $\theta_1$ is a tilt angle of said light rays.

6. An image display apparatus according to claim 1 or 2, which satisfies the following condition:

$$30° < \theta_2 < 60° \quad (2)$$

where $\theta_2$ is an angle between said first surface and said second surface.

7. An image display apparatus according to claim 1 or 2, wherein internal reflection at said second surface is total reflection.

8. An image display apparatus comprising an image display device for displaying an image, and an ocular optical system for projecting the image displayed by said image display device and for leading the projected image to an observer's eyeball, said ocular optical system having at least four optical surfaces, wherein a space formed by said at least four optical surfaces is filled with a medium having a refractive index larger than 1, said at least four optical surfaces being defined as a first surface, a second surface, a third surface, and a fourth surface, respectively, in order in which light rays pass in backward ray tracing from said observer's eyeball to said image display device, and said at least four optical surfaces being disposed such that light rays pass in backward ray tracing from said observer's eyeball pass through the first surface and are reflected by the second surface and further reflected by the third surface, which is a reflecting surface having positive power, and the light rays reflected by said third surface are reflected by said first surface and pass through the fourth surface to reach said image display device.

9. An image display apparatus according to claim 8, wherein the reflection at said first surface is total reflection.

10. An image display apparatus according to claim 8 or 9, wherein said third surface is disposed such that light rays on an observer's visual axis which have been reflected by said second surface are tilted at approximately 30° toward said observer's eyeball by reflection at said third surface.

11. An image display apparatus according to claim 10, which satisfies the following condition:

$$20° < \theta_1 < 45° \quad (1)$$

where $\theta_1$ is a tilt angle of said light rays.

12. An image display apparatus according to claim 10, which satisfies the following condition:

$$25° < \theta_1 < 40° \quad (1')$$

where $\theta_1$ is a tilt angle of said light rays.

13. An image display apparatus according to claims 8 or 9, which satisfies the following condition:

$$30° < \theta_2 < 60° \quad (2)$$

where $\theta_2$ is an angle between said first surface and said second surface.

14. An image display apparatus according to claim 1, 2, 8 or 9, wherein at least one optical boundary surface is disposed in an optical path of said optical system.

15. An image display apparatus according to claim 1, 2, 8 or 9, further comprising means for positioning both said image display device said ocular optical system with respect to an observer's head.

16. An image display apparatus according to claim 1, 2, 8 or 9, further comprising means for supporting both said image display device and said ocular optical system with respect to an observer's head so that said image display apparatus can be fitted to said observer's head.

17. An image display apparatus according to claim 1, 2, 8 or 9, further comprising means for supporting at least a pair of said image display apparatuses at a predetermined spacing.

18. An image display apparatus according to claim 1, 2, 8 or 9, wherein said ocular optical system is used as an imaging optical system.

*19. An ocular optical system disposed between an image plane and a pupil,*

*said optical system comprising a prism member having at least three surfaces including a first surface, a second surface, and a third surface, wherein a space formed by said at least three surfaces is filled with a medium having a refractive index larger than 1,*

*wherein said prism member is arranged such that light rays as traced from said image plane toward said pupil first pass through said second surface and are then reflected by said first surface and further reflected by said third surface, and the reflected light rays are reflected by said second surface and pass through said first surface, and/or such that light rays as traced from said pupil toward said image plane first pass through said first surface and are then reflected by said second surface and further reflected by said third surface, and the reflected light rays are reflected by said first surface and pass through said second surface, and*

*wherein at least one of said first surface, said second surface and said third surface is a curved surface.*

*20. An ocular optical system according to claim 19, wherein said first surface is positioned to face opposite to said image plane.*

*21. An ocular optical system according to claim 19, wherein said first surface has a curved surface configuration which gives a positive power to the light rays when reflected by said first surface.*

*22. An ocular optical system according to claim 19, wherein said second surface has a curved surface configuration which gives a positive power to the light rays when reflected by said second surface.*

*23. An ocular optical system according to claim 19, wherein said third surface has a curved surface configuration which gives a positive power to the light rays when reflected by said third surface.*

*24. An ocular optical system according to claim 19, 20, 21, 22 or 23, wherein said prism member inverts the image formed on said image plane, upside down.*

*25. An ocular optical system according to claim 24, wherein said first surface has a rotationally asymmetric curved surface configuration having an action by which decentration aberrations are corrected.*

*26. An ocular optical system according to claim 24, wherein said third surface has a rotationally asymmetric curved surface configuration having an action by which decentration aberrations are corrected.*

*27. An ocular optical system according to claim 24, wherein said first surface is formed from a spherical surface.*

*28. An ocular optical system according to claim 24, wherein said second surface is formed from a spherical surface.*

*29. An ocular optical system according to claim 24, wherein said third surface is formed from a spherical surface.*

*30. An ocular optical system according to claim 24, wherein reflection at said first surface is total reflection.*

31. An ocular optical system according to claim 24, wherein reflection at said second surface is total reflection.

32. An ocular optical system according to claim 24, wherein said prism member is arranged such that a spacing between said first surface and second surface gradually increases toward said third surface.

33. An ocular optical system according to claim 24, which satisfies the following condition:

$$30° < \theta_2 < 60°$$

where $\theta_2$ is an angle formed between said first surface and said second surface.

34. An ocular optical system according to claim 24, further comprising a lens disposed between said prism member and said image plane.

35. An ocular optical system according to claim 34, wherein said lens is cemented to said second surface of said prism member.

36. An ocular optical system according to claim 24, wherein a field angle in a horizontal direction of said prism member is different from a field angle in a vertical direction thereof.

37. An ocular optical system according to claim 24, wherein the field angle in the horizontal direction of said prism member is larger than the field angle in the vertical direction thereof.

38. An image-forming optical system which forms an image of an object, said image-forming optical system comprising at least one prism member, wherein said prism member has at least three optical surfaces, wherein a space formed by said at least three optical surfaces is filled with a medium having a refractive index larger than 1, and said at least three optical surfaces are defined as a first surface, a second surface, and a third surface, respectively, in order of ray tracing from the object to an image plane, said at least three optical surfaces being disposed such that light rays from said object pass through said first surface and are then reflected by said second surface and further reflected by said third surface, and the reflected light rays are reflected by said first surface and pass through said second surface to reach said image plane, and wherein at least one of said first surface, said second surface and said third surface is formed from a curved surface to give a positive power to the light rays when reflected by said at least one surface.

39. An image-forming optical system according to claim 38, wherein said first surface is positioned to face opposite to said image plane.

40. An image-forming optical system according to claim 38, wherein said first surface has a curved surface configuration which gives a positive power to the light rays when reflected by said first surface.

41. An image-forming optical system according to claim 38, wherein said second surface has a curved surface configuration which gives a positive power to the light rays when reflected by said second surface.

42. An image-forming optical system according to claim 38, wherein said third surface has a curved surface configuration which gives a positive power to the light rays when reflected by said third surface.

43. An image-forming optical system according to claim 38, 39, 40, 41 or 42, wherein reflection at least one of said first surface and second surface is total reflection.

44. An image-forming optical system according to claim 43, wherein said first surface has a rotationally asymmetric curved surface configuration having an action by which decentration aberrations are corrected.

45. An image-forming optical system according to claim 43, wherein said third surface has a rotationally asymmetric curved surface configuration having an action by which decentration aberrations are corrected.

46. An image-forming optical system according to claim 43, wherein said first surface is formed from a spherical surface.

47. An image-forming optical system according to claim 43, wherein said second surface is formed from a spherical surface.

48. An image-forming optical system according to claim 43, wherein said third surface is formed from a spherical surface.

49. An image-forming optical system according to claim 43, wherein said prism member is arranged such that a spacing between said first surface and said second surface gradually increases toward said third surface.

50. An image-forming optical system according to claim 43, which satisfies the following condition:

$$30° < \theta_2 < 60°$$

where $\theta_2$ is an angle formed between said first surface and said second surface.

51. An image-forming optical system according to claim 43, further comprising a lens disposed between said prism member and said image plane.

52. An image-forming optical system according to claim 51, wherein said lens is cemented to said second surface of said prism member.

53. An image-forming optical system according to claim 43, wherein a field angle in a horizontal direction of said prism member is different from a field angle in a vertical direction thereof.

54. An image-forming optical system according to claim 43, wherein the field angle in the horizontal direction of said prism member is larger than the field angle in the vertical direction thereof.

55. A camera apparatus according to claim 43, wherein said image-forming optical system is disposed to perform image formation.

56. A camera apparatus according to claim 55, wherein a photographic optical system and a finder optical system are disposed separately from each other.

57. A camera apparatus according to claim 56, wherein said image-forming optical system is disposed in said finder optical system.

58. A camera apparatus according to claim 57, wherein said finder optical system includes, in order from an object side thereof, said image-forming optical system; an image erecting optical system for erecting the object image formed by said image-forming optical system; and an ocular optical system for observing said object image.

59. An optical system disposed between an image plans and a pupil, said optical system comprising at least one prism member, said prism member having at least three reflecting surfaces that reflect a light beam in said prism member, said three reflecting surfaces being so arranged that optical paths intersect each other in said prism member, wherein at least one of said at least three reflecting surfaces has a curved surface configuration.

60. An optical system according to claim 59, wherein said at least three reflecting surfaces of said prism member are curved surfaces.

* * * * *